UNITED STATES PATENT OFFICE.

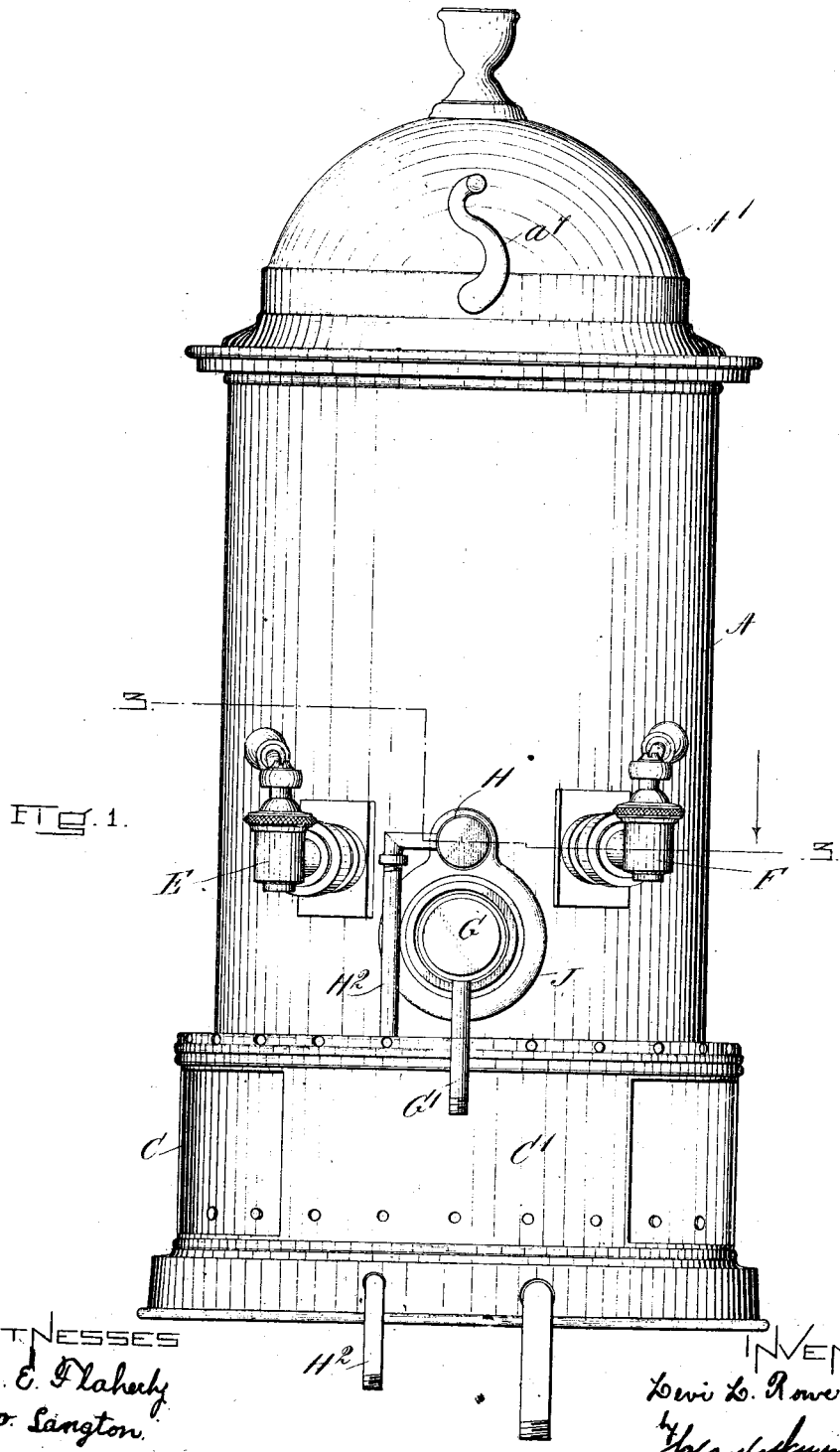

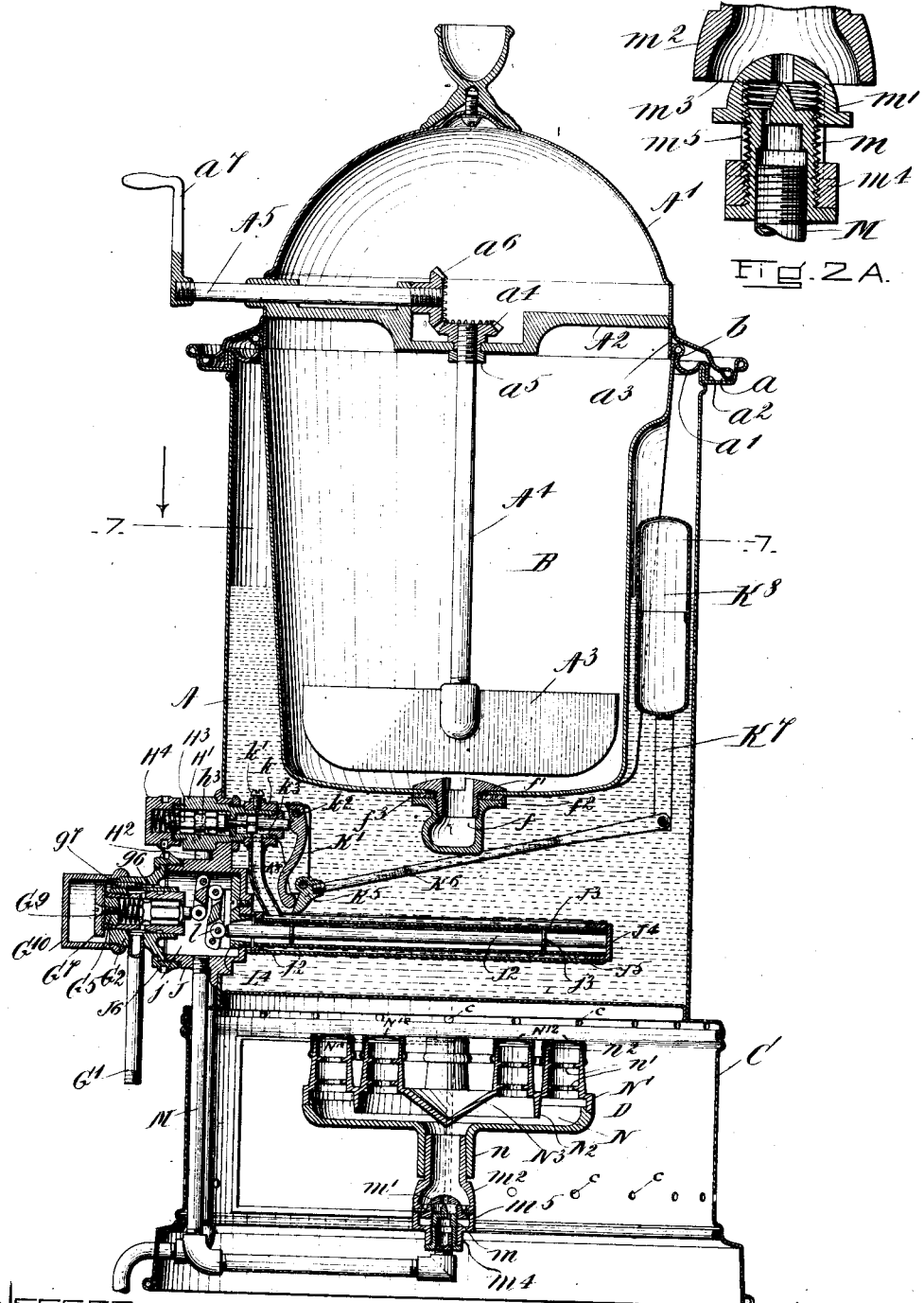

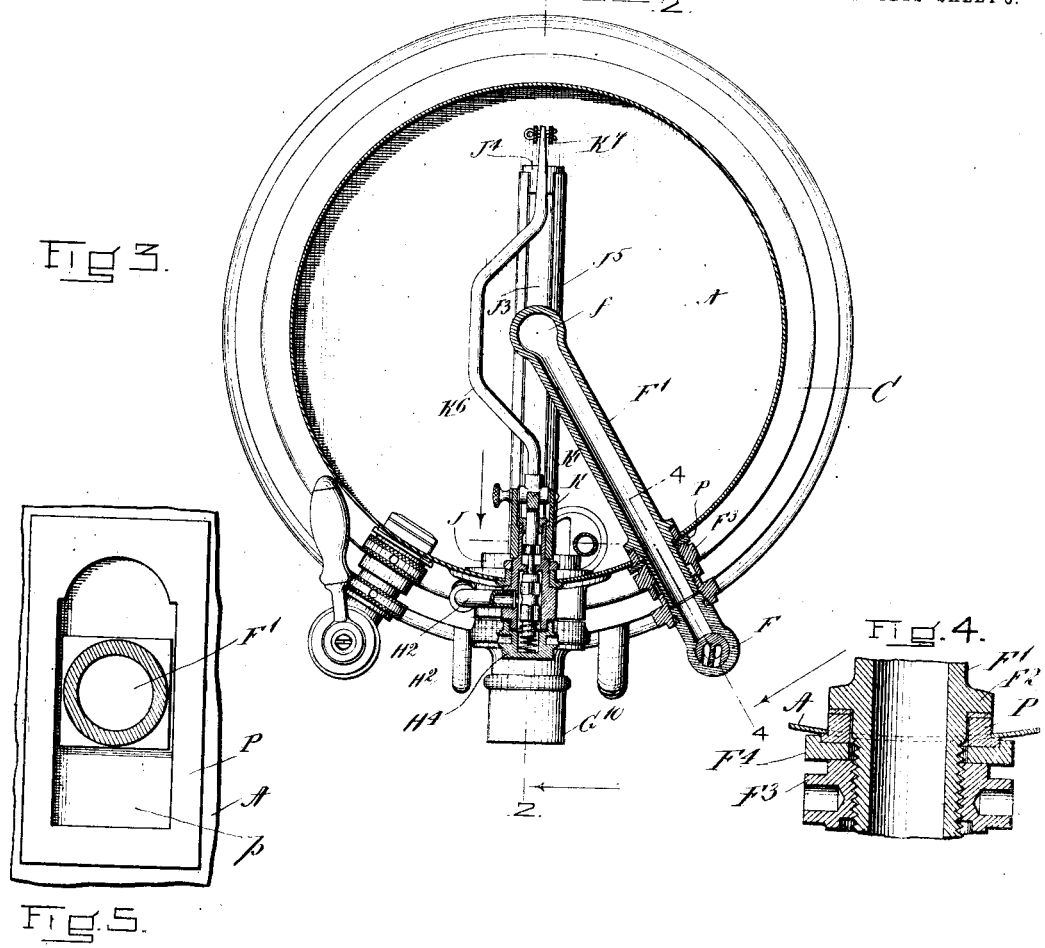

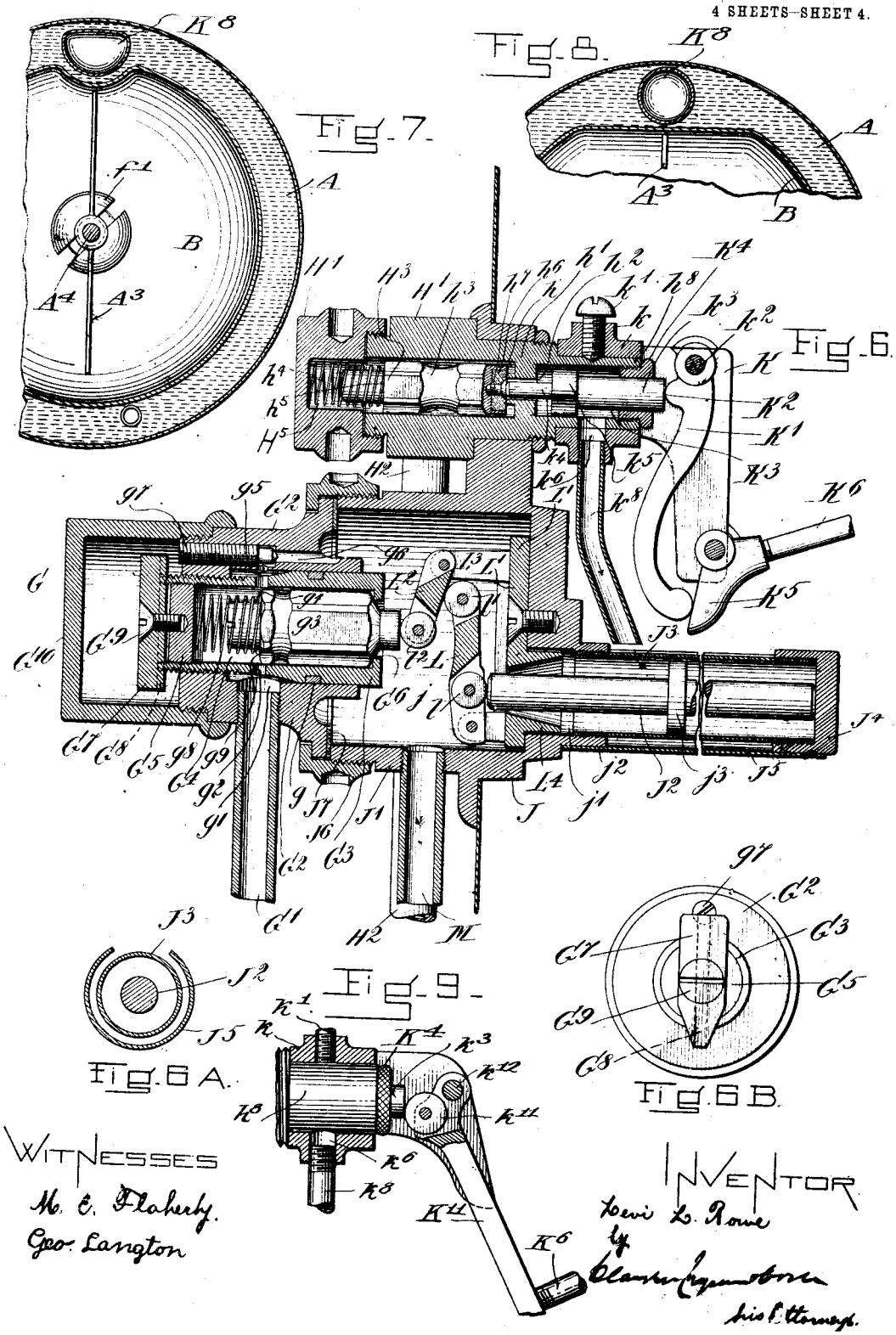

LEVI L. ROWE, OF BOSTON, MASSACHUSETTS.

CHOCOLATE-URN.

1,032,507.

Specification of Letters Patent. Patented July 16, 1912.

Application filed November 30, 1909. Serial No. 530,573.

*To all whom it may concern:*

Be it known that I, LEVI L. ROWE, of Boston, in the county of Suffolk and State of Massachusetts, a citizen of the United States, have invented a new and useful Improvement in Chocolate-Urns, of which the following is a specification My invention relates to improvements in urns for heating liquids and it consists mainly in certain details of construction relating to the automatic control of the gas supplied to the burners and the automatic control of the supply of water to the tank and certain other matters to be referred to below. Apparatus of this character may be constructed either to heat one liquid only or to heat two liquids separately, the second liquid being contained in a tank suspended within the apparatus and deriving its heat from the heat of the other liquid which surrounds it.

While my invention is shown embodied in an apparatus of this latter class certain of its details may be otherwise used.

My invention will be understood by reference to the drawings, in which—

Figure 1 is an elevation of a tank embodying my invention. Fig. 2 is a vertical section taken on line 2—2 of Fig. 3. Fig. 2$^A$ is an enlarged vertical section of the gas inlet shown in Fig. 2. Fig. 3 is a horizontal section on line 3—3 of Fig. 1. Fig. 4 is an enlarged view of a portion of Fig. 3, Fig. 5 is a front view of the tank with the pipe F$^1$ and clamp nuts removed. Fig. 6 is an enlarged sectional view of the valve mechanism shown in Fig. 2. Fig. 6$^A$ is a cross section of the thermostat. Fig. 6$^B$ is an end view of the gas valve indicator. Fig. 7 is a horizontal section on line 7—7 of Fig. 2. Fig. 8 is a fragmentary section comprising a portion of Fig. 7, but showing a modification of the float valve and inner tank structure, and Fig. 9 shows a modification of the float connection with the water valve.

As a matter of convenience I have shown my invention applied to an apparatus for serving hot chocolate in which the main tank A serves to hold hot water which will keep the chocolate hot, the chocolate being contained in the tank B suspended in the outer vessel A from which water may be drawn off to dilute the chocolate if desired. It may be embodied in an apparatus for other drinks as well.

The outer vessel or tank A is supported on a stand C within which is the gas burner D for heating the contents of the tank A as shown in Fig. 2. The stand is perforated as at $c$ to permit an air supply and has a slide $C^1$ to cover an opening in the stand. The slide $C^1$ is shown in closed position. The tank A has two faucets E and F, the faucet E for drawing water from it and the faucet F connected to the chocolate tank B to draw chocolate from it. The tank A also carries a gas supply control G and a water supply control H, these parts being set into a plate or casing J carried in the wall of the tank A and brazed or otherwise attached thereto to form a watertight joint. These various parts will now be described. These controls are similar in some respects and may be described generically as fluid controls in so far as they are alike.

The water control comprises a casting $H^1$ containing a chamber $h$ to which water is led from a water supply by the pipe $H^2$, the casting $H^1$ being suitably secured in an opening in the plate J. One wall of this chamber is formed by a diaphragm $h^1$ which is pierced as at $h^2$ to form a passage for the water to the tank as below described. The passage of water therethrough is controlled by the valve $H^3$. This valve $H^3$ is polygonal in cross section so as to slide in a right line in the valve chamber and at the same time to allow water to pass through the passage $h^2$ except when the valve is seated. It is preferably turned down to cylindrical form as at $h^3$ to give the water from the pipe $H^2$ freer access to the chamber $h$.

The end of the chamber $h$ opposite the passage $h^2$ is closed by a cap $H^4$ which is recessed to form part of the chamber $h$ and especially to receive the spring $h^4$ which tends to force the valve $H^3$ to its seat and close the passage $h^2$. The cap $H^4$ is preferably screwed onto the outer end of the casing $H^1$, being provided with recesses to receive the ends of a spanner.

The spring $h^4$ lies between the end of the recess in the cap $H^5$ and a shoulder $h^5$ on the valve which is turned down at its rear end to form not only the shoulder but also a stem to center the spring $h^4$. The farther end of the valve carries a rubber plug $h^6$ which is set into a recess therein and held in place by a screw $h^7$ to form a packing for the valve.

The valve is automatic to maintain the water at a fixed level. To open it I have provided a float mechanism as follows: The end of the casting $h^i$ which projects through the plate J in the front of the tank A is reduced in size as at $h^5$ to receive a collar $k$ which is clamped thereto by a set screw $k^1$. This collar $k$ carries a bracket K to which is pivoted at $k^2$ a lever $K^1$ having a projection $K^2$ adapted to engage the end of a valve-engaging rod $k^3$. This rod lies in a chamber $K^3$ separated from the chamber $h$ by the diaphragm $h^1$. This rod near its farther end is reduced in size as at $k^4$ to pass through the passage $h^2$, being somewhat smaller in diameter than the diameter of the passage so as to allow water to pass around it. The portion $k^5$ of the rod is square to center the rod in the chamber $K^3$ and yet allow the water to pass in. The diaphragm $h^1$ therefore separates the chamber $h$ from the chamber $K^3$. The perforation in it serves as part of the water channel to the interior of the tank and the side of the diaphragm forming a wall of the chamber $h$ also serves as a valve seat for the valve $H^3$. A perforated plug $K^4$ closes the end of the chamber $K^3$, being perforated to allow the part $k^3$ to project through it. To the bracket K is also pivoted the hinge piece $K^5$ carrying the rod $K^6$ to the outer end of which is pivotally attached a rod $K^7$ carrying a float $K^8$. This float may be either cylindrical in construction as shown in Fig. 8 or may be of the shape in cross section shown in Fig. 7. Its shape is immaterial but for economy of space and cost its shape and that of the inner tank B must be interrelated as indicated in these views, thus maintaining the shape of the tank A without increasing its diameter. Sufficient room must be provided for allowing the float to rise and fall freely.

The collar $k$ has an opening $k^6$ which registers with an opening in the wall of the chamber $K^3$ and a pipe $k^8$ screwed into the opening $k^6$ leads the water from the chamber $K^3$ into the interior of the tank A,—preferably directly into the thermostat as below described.

When the water in the tank A falls below its desired level the float $K^8$ falls with it. Through the intermediate levers, this causes the engaging rod $k^3$ to be pushed in so that it opens the valve $H^3$ against the force of the spring $h^4$ so that water will enter the chamber $h$ from the source of supply through the pipe $H^5$ and pass out into the chamber $K^3$ and out through the pipe $k^8$ into the tank A. As the level in the tank A gradually rises the valve $H^3$ gradually closes.

The gas supply is controlled by a thermostat of peculiar construction which by its change of length controls the gas valve as will now be described.

The casting $G^2$ is attached to the plate J in the following manner: The piece J above referred to has a circular flange $J^1$ which projects outwardly from the tank A and forms a wall of a chamber $j$ the inner portion of which is formed by a recess in the plate itself. The inner wall of this chamber $j$ is perforated as at $j^1$ for the passage of the movable member $J^2$ of the thermostat. Around the perforation is a flange $j^2$ threaded on its interior to receive the threaded end of the cylindrical member $J^3$ of the thermostat, the outer end of which is closed by the cap $J^4$. The cylindrical member $J^3$ of the thermostat is made of a metal which expands and contracts freely under the action of heat and cold and hence any change of temperature will change the distance of the cap $J^4$ from the plate J. The movable member $J^2$ of the thermostat is made of metal less sensitive to changes of temperature and hence when the part $J^3$ contracts the cap $J^4$ will push the member $J^2$ to the left (see Fig. 2), through the perforation $j^1$, but will allow said member $J^2$ to be pushed back, or toward the right as shown in Figs. 2 and 6, as said member $J^3$ expands again. The part $J^2$ is provided with a centering collar $j^3$ to support it axially in the cylinder $J^3$. About the cylindrical member $J^3$ is a trough $J^5$ also made of easily expansible metal and open at the top substantially throughout its length. It is held in place by the cap $J^4$ at one end and by the flange $j^2$ at the other to which parts it is brazed or otherwise attached. The thermostat is located directly under the end of the pipe $k^8$ so that the fresh water coming into the tank, first fills the trough $J^5$ from which it overflows into the tank. By means of this arrangement of pipe, trough and thermostat, the thermostat is immediately cooled on the introduction of fresh water into the tank and contracts, thus pushing out the rod $J^2$ and operating the gas valve to turn on the gas in the manner now to be described.

To the outer end of the flange $J^1$ is coupled by a coupling $J^6$ a tubular section $G^2$ into which is screwed a valve casing $G^3$. A gasket $J^7$ is best used to prevent the leakage of gas around the coupling $J^6$ and a packing $g$ lies in a groove in the outside of the casing $G^3$ to make a gas-tight joint. Gas is led into the valve chamber $G^4$ within the casing $G^3$ from the supply pipe $G^1$ through the opening $g^1$ in the section $G^2$ and a perforation $g^2$ registering therewith in the casing $G^3$. The outer end of the casing $G^3$ is closed by a screw plug $G^5$ and its inner end is partially closed to form a valve seat $G^6$. The plug $G^5$ carries an indicator $G^7$ which is preferably provided with a feather $G^8$ on its inner side to fit into a slot in the head of the plug $G^5$, being attached thereto by a screw $G^9$. This indicator shows the amount of adjustment given to the plug and hence to the spring $g^8$ below referred to and by means of it the gas supply is thus adjusted according to the amount of heat desired. A cap $G^{10}$ screwed to the end of the section $G^2$ keeps these parts from ordinary interference.

Within the valve casing $G^3$ is a valve $g^3$ which closes against the valve seat $G^6$. This valve $g^3$ is polygonal in shape, the chamber in which it moves being round. Thus it allows gas to pass by it and out through the valve seat when it is not seated. It is turned down as at $g^4$ to form a ready clearance for the passage of gas and also to allow a constant passage of gas through the perforation $g^5$ to the pilot passage $g^6$ which is formed in the tubular section $G^2$. This pilot passage is controlled by the screw $g^7$. A spring $g^8$ bearing against a shoulder $g^9$ near the rear of the valve and adjusted by the position of the plug $G^5$, tends to force the valve forward against its seat.

The valve is opened by means of a system of levers, one of which L is pivoted to a plate $L^1$ which is attached to the inner wall of the chamber $j$ and carries a friction roller $l$ against which the end of the thermostat rod $J^2$ presses. The upper end of this lever L also carries a friction roll $l^1$ which bears against a lever $L^2$ attached to a bracket $L^3$ projecting from said plate $L^1$. The other end of this lever carries a friction roller $l^2$ which bears against the end of the valve.

A pipe M leads from the chamber $j$ to the burners. When the thermostat is chilled its rod or non-extensible member $J^2$ is thrust into the chamber $j$ and moves the lever system above described so that the valve $g^3$ is opened and gas passes from the pipe $G^1$ through the valve system to the chamber $j$ and out through the pipe M. As the contents of the tank become sufficiently warm the pressure of the rod $J^2$ upon the lever system being released more or less, the spring $g^8$ asserts itself again to close the valve and cut off the main gas supply.

The pilot passage supplies sufficient gas to the burners to keep the flame alive and so that the contents of the tank will be warm.

I prefer to provide the plate $L^1$ with a boss $L^4$ which sets into the opening $j^1$. It has a passage through it for the rod $J^2$ and assists in centering the rod $J^2$.

As shown the heating apparatus fed by the gas valve comprises a cluster of burners (see Fig. 2), arranged about a common center upon a gas reservoir N. This heater is peculiar in that satisfactory provision is made for it to distribute the gas so that all the burners will receive a constant amount and will give out a uniform flame.

The pipe M passes down inside of the stand C and through it to a point under the middle of the tank A. To its end is attached by a suitable coupling a tip $m$ provided with one or more perforations for the escape of gas and upon this tip $m$ is carried a dome $m^1$ having a central passage for the gas. A casing $m^2$ provided with air inlets $m^3$ surrounds the tip and dome and provides with the reservoir a chamber for the mixing of the air and gas. This casing is supported from a screw collar $h^4$ between which the air inlets are provided.

The reservoir N comprises a casting having a tubular portion $n$ adapted to be set onto the upper end of the casing $m^2$. A cap $N^1$ forms the top of the reservoir. It is provided with a number of openings into each of which is set a burner $N^{12}$. These openings are arranged in one or more circles near the edge of the cap $N^1$ and from the under side of the cap projects downward a circular flange $N^2$ which reaches nearly to the bottom of the reservoir, leaving only a narrow passage for the gas to reach the burners. From the center of the under side of the cap projects downward an inverted conical deflector $N^3$ the tip of which enters the inlet through the part $n$.

While I have thus shown and described a preferred construction and arrangement of burners for heating the tank A it will be obvious that any other suitable form of heater, capable of receiving its fuel from the pipe M, may be substituted therefor as may be found convenient.

The upper edge of the tank A is bent back on itself and then outward and upward to form a channel $a$. A ring also channeled as at $a^1$ has a downwardly turned lip $a^2$ which is adapted to rest in the channel $a$. Its upper inner edge forms a rest for the upper edge $b$ of the inner tank B which upper edge is turned outward and finished around a reinforcing wire. This ring prevents the accidental pouring of liquid intended for the inner tank into the outer tank.

The top $A^1$ of the tank has a divided edge one portion of which $a^3$ sets down within the tank B while the other portion spreads outward and covers the channel $a^1$ in the ring and terminates in the channel $a$ at the top of the tank.

A brace $A^2$ within the top or cover for the tank serves to strengthen it and when shaped as shown serves also as a support for a rotatable paddle $A^3$ which is hung on the lower end of the shaft $A^4$, the upper end of which passes up through an opening in the brace $A^2$ and is held therein by a bevel gear $a^4$ which is screwed onto its upper end and a nut $a^5$ which it carries and which lies below the brace $A^2$. The brace $A^2$ also carries a horizontal shaft $A^5$ in suitable bearings, this shaft having a bevel gear $a^6$ at one end meshing with the gear $a^4$ and a crank handle $a^7$ at the other so that the paddle may be turned. This device is useful when the tank B contains chocolate or other thick substance.

The bottom of the tank B is perforated and when the tank is in position it rests upon the inner end of the pipe F¹ upon the outer end of which is the faucet F through which the contents of the tank are withdrawn. For this purpose the inner end of the pipe F¹ is closed, but on its upper side it has a circular opening f which is threaded on its interior to receive a hollow clamp screw f¹ and is flanged at f² to assist in supporting the tank B. The tank B rests upon a gasket f³ laid upon this flange f² and the screw f¹ being screwed down into the opening with its head resting upon the bottom of the chocolate tank B, clamps the tank in position and makes a liquid-tight joint.

The pipe F¹ which carries the faucet F has by preference a collar or flange F² around it near its outer end, its outer end being threaded to receive a clamp nut F³. A plate P (see Fig. 5), the inner surface of which is curved on the radius of the tank A, its front or outer surface being flat, is soldered into an opening in the tank. This plate has an opening p in it through which the pipe F¹ passes and the pipe F¹ carries a slide F⁴ which slides on the outer edges of the plate P so that the height of the pipe may be adjusted according to the requirements of the inner tank B. These tanks are not always the same depth and as the inner end of the pipe F¹ is attached to the bottom of the tank the faucet must be arranged to adjust its height as occasion may require. After the outer end of the pipe F¹ has found its proper level a clamp nut F³ screwed onto its outer end and clamping the parts P and F⁴ holds the pipe at the proper level.

The apparatus above described solves several problems in the art of making urns of this general character, but its details may be changed somewhat without departing from the spirit of my invention. Moreover the various parts of the invention may be used under different environments to accomplish their purpose, and may still be within the scope of my claims. I have used the terms "water" and "chocolate" simply for convenience as other liquids may be used in the tanks if thought best.

The operation will be clear without further description and lies in its being automatic in all respects. That is, the liquid in the tank will be kept at a constant level and the introduction of fresh water will cause an immediate increase of flame, the thermostat by which the gas is controlled being rendered very sensitive by the fact of its being horizontal and also by the use of the jacket which receives the first water introduced into the tank and holds it so that it chills the thermostat very rapidly, the open top of the jacket or trough however, which extends substantially throughout the length of the thermostat, permitting a rapid commingling of the cold incoming water with the warmer water in the tank, so that the gas flame is quickly checked as soon as the chilling effect of the incoming water has been compensated for. The other features of its operation are explained above.

It will be seen that my invention lends itself to easy adjustment and repair. The controls for the gas and water may be removed as a whole or the gas control removed for examination and readjustment. I have shown (though not specifically referred to) gaskets at those points where leakage is liable to occur and they may be easily replaced whenever necessary. The thermostat is especially quick to respond to differences of temperature because it is horizontal and receives the incoming water in its surrounding trough and holds it, thus maintaining the gas control in a fixed position until the water has been heated to a proper temperature. It is located near the bottom of the tank where the water will be the coldest.

In Fig. 9 I have shown a more simple connection between the float and the water valve. In this case the float rod K⁶ is attached directly to the lever K¹¹ which is pivoted at k¹² to the part K. A friction wheel k¹¹ engages the end of the part k³, and the lever K¹¹ moves the part k³ exactly as does the lever K¹ in the form of construction shown in Fig. 6.

What I claim as my invention is:—

1. A chocolate urn comprising, in combination, a tank, one or more burners for heating said tank, an automatic fuel control for said burners including a horizontally arranged thermostat located within said tank, a trough partly inclosing said thermostat but open at the top substantially throughout its length, and means for supplying liquid to said tank arranged to discharge the same into said trough.

2. A chocolate urn comprising, in combination, a tank, one or more burners located beneath said tank for heating the same, an automatic fuel control for said burners including a horizontally arranged thermostat located within said tank adjacent the bottom thereof, a trough partly inclosing said thermostat but open at the top substantially throughout its length, and means for supplying liquid to said tank arranged to discharge the same into said trough.

3. A chocolate urn comprising, in combination, a tank, one or more burners for heating said tank, an automatic fuel control for said burners including a thermostat located within said tank, a jacket partly inclosing said thermostat but having a portion open to said tank substantially throughout the length of said thermostat, a liquid control for automatically maintaining a constant level of liquid in said tank, and means for discharging the incoming liquid into said jacket.

4. The combination with a tank and one or more gas burners for heating said tank, of a valve for controlling the passage of gas to said burners, a horizontally arranged thermostat located within said tank for controlling said valve, a trough partly inclosing said thermostat but open at the top substantially throughout its length, a float valve for controlling the admission of liquid to said tank, and a pipe leading from said float valve to said trough.

LEVI L. ROWE.

Witnesses:
GEORGE O. G. COALE,
M. E. FLAHERTY.